United States Patent [19]

Simmons

[11] Patent Number: 5,711,422
[45] Date of Patent: Jan. 27, 1998

[54] ATTACHABLE CASSETTE HOLDER

[76] Inventor: Cynthia Ann Simmons, 5725-94th, Lubbock, Tex. 79424

[21] Appl. No.: 477,355

[22] Filed: Jun. 7, 1995

[51] Int. Cl.$^6$ ............................................. B65D 85/575
[52] U.S. Cl. ...................... 206/232; 206/387.1; 229/68.1
[58] Field of Search ............................... 206/232, 307, 206/307.1, 308.3, 311–313, 387.1, 387.13, 813; 229/68.1; 383/84, 86

[56] References Cited

U.S. PATENT DOCUMENTS

| | | | |
|---|---|---|---|
| 2,175,327 | 10/1939 | Thornhill et al. | 383/86 |
| 3,104,798 | 9/1963 | Stone | 383/86 |
| 3,583,729 | 6/1971 | DeGroot | 206/387.13 |
| 3,764,003 | 10/1973 | Loss . | |
| 3,829,132 | 8/1974 | Willieme | 206/232 |
| 3,866,751 | 2/1975 | Holert . | |
| 4,002,355 | 1/1977 | Sendor | 206/387.13 |
| 4,253,567 | 3/1981 | Goldammer . | |
| 4,473,153 | 9/1984 | Colangelo | 206/313 |
| 4,555,290 | 11/1985 | Graetz et al. . | |
| 4,560,359 | 12/1985 | Wilson et al. . | |
| 4,651,872 | 3/1987 | Joyce | 206/308.3 |
| 4,867,310 | 9/1989 | Cannon et al. | 206/387.13 |
| 4,966,318 | 10/1990 | Dutka | 383/86 |
| 5,007,540 | 4/1991 | Beasley et al. | 206/813 |
| 5,022,522 | 6/1991 | Kennedy | 206/307.1 |
| 5,097,952 | 3/1992 | Katagiri . | |
| 5,146,729 | 9/1992 | Sato . | |
| 5,165,544 | 11/1992 | Gusenoff et al. | 206/308.3 |
| 5,195,634 | 3/1993 | Zaug . | |
| 5,207,717 | 5/1993 | Manning . | |
| 5,445,264 | 8/1995 | Uchida | 206/307.1 |

FOREIGN PATENT DOCUMENTS 2104774  3/1983  United Kingdom ............... 206/387.1

*Primary Examiner*—Jimmy G. Foster
*Attorney, Agent, or Firm*—Novak Druce & Burt

[57] ABSTRACT

The present invention is a holder for attachment to an article to be viewed in conjunction with listening to an audio recording. The audio recording is carriable in the holder for preventing the recording from becoming disassociated from the article so that the audio recording can be readily played while viewing the article. The holder includes a body having a first section, a second section and a third section. The third section is folded onto the second section. At least a portion of a periphery of the body is sewn so that the second section and the third section form a pocket for holding the recording. A releasable closing mechanism has first and second components where the first component is coupled to the first section and the second component is coupled to the third section. The first section releasably couples with the third section to form a flap to close the pocket. A coupling mechanism is coupled to the holder for coupling attachment to the article therewith.

2 Claims, 4 Drawing Sheets

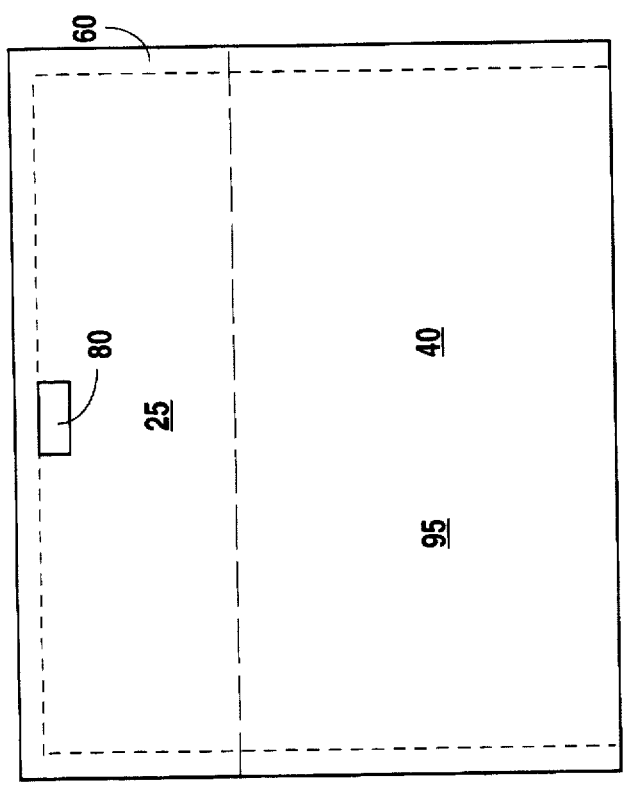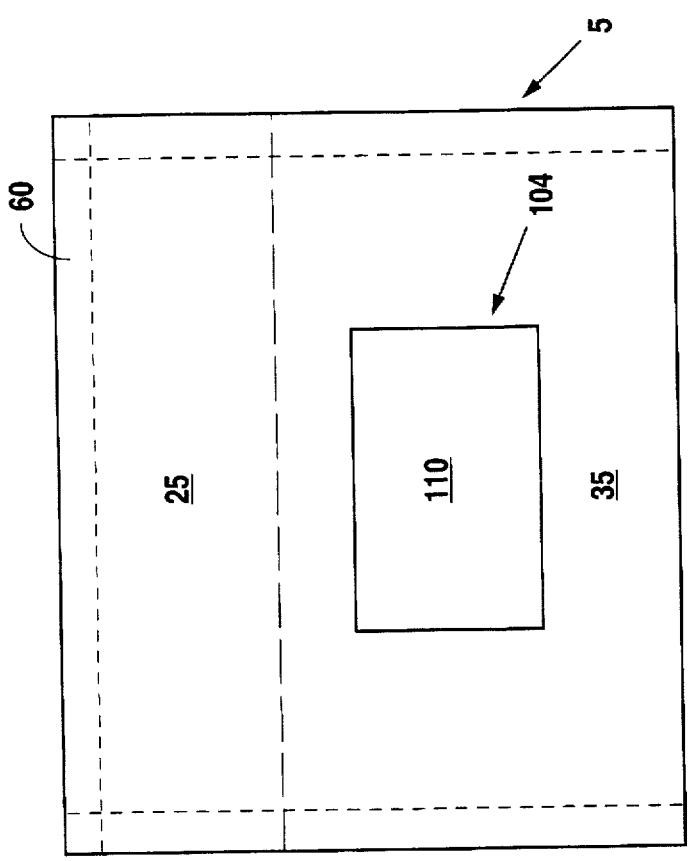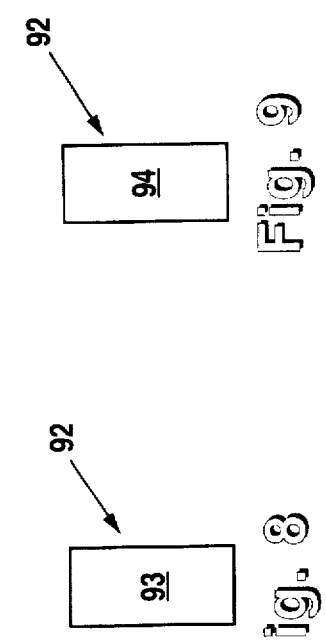

ATTACHABLE CASSETTE HOLDER

FIELD OF THE INVENTION

The present invention relates generally to accessories for audio recording devices. More particularly, it relates to a cassette holder that can be attached to a bound volume.

BACKGROUND OF THE INVENTION

Audio cassette tapes may be used alone, to listen to music, for instance, or they may be used in conjunction with written text or illustrations where one compliments the other. Typically, audio recordings such as cassette tapes are sold for listening to music. Cassette tapes, along with other audio recordings, can also be used in conjunction with visual materials, such as books or slides when sound is desired as an accompaniment thereto. Most audio cassette tapes are enclosed in a cassette box for storing the tape when not in use. Several patents have issued dealing with the storage of cassette tapes; however, one deals with the problem of storing a cassette tape with a book.

U.S. Pat. No. 3,866,751 to Holert for a Book With Cassette Holding Recess includes disclosure of a book with a recess in its cover so that a cassette tape can be stored therein. A cover enclosing the recess can be opened from the outside of the book so that access to the tape can be obtained. This patent, however, does not address the problem of storing a cassette tape with a book where the book has not been designed to hold a cassette tape.

Some books are being sold with cassette tapes that are to be played in conjunction with reading the book. This is particularly true with respect to children's books and books for those that are handicapped in ways that make it difficult, if not impossible to read conventional books. These books, however, are not designed to hold a cassette tape. Therefore the tape can become separated from the book and misplaced. In addition, if an individual wants to create his own tape to be used in conjunction with a book, no storage means exists for storing the cassette tape with the book. Furthermore, a need exists for storing audio recordings with articles besides books. A good example would be photo albums. In the example of a photo album, a tape can be made to narrate a viewer's progress through the pictures contained therein.

SUMMARY OF THE INVENTION

The present invention is in response to recognition of the need for a device that will store a cassette tape as described above. It should be understood, however, that the holder can be designed to hold other audio recordings such as digital audio tapes (DAT) or compact discs (CD). Also, the invention can be designed to hold a plurality of audio recordings or tapes. The invention is referred to as an attachable cassette holder because the cassette holder can be attached to books or other bound volumes that are not adapted to store cassettes within their structure. It is anticipated, however, that the holder can be associated with an article in a releasable fashion as well.

Because the articles may vary in construction and material composition, different embodiments for coupling the attachable cassette holder to the article is envisioned. One embodiment uses a hook and loop connector sold under the trademark (VELCRO) for attaching the cassette holder to the article. Another embodiment uses an elongated tape member for attaching the cassette member to the article. As a result, these embodiments provide greater flexibility for attaching the cassette holder to the article.

The present invention also includes a flap for closing the pocket holding the cassette tape. Again different embodiments may be used to close the flap to secure the tape in the pocket. One embodiment similarly uses a hook and loop connector sold under the trademark (VELCRO), while another uses a releasable tape member.

It is desirable to have the holder includable in the manufacture of new books, though the invention is well suited to be easily attached to an existing bound volume. In a preferred embodiment, the attachable cassette holder may be coupled to any part of the book with two-sided tape. FIG. 4 shows a pair of two sided sticky tape strips that is mounted to the back side of the cassette holder for attaching the holder to the book. FIGS. 5 and 6 show a holder having one component of a hook and loop connector attached to the holder while the other is attached to the book. The holder can be coupled to the book by engaging the hook and loop components. In this embodiment, the holder is releasably couplable with the book. The holder may, however, be attached by any suitable means to an article to which it is to be associated. It may be releasably coupled to the book by such means as the hook an loop connector or by snaps. It may be more permanently attached to the book by such means as rubber cement and the like. While the holder has been described thus far as being attached to the outside of the book, and in particular to an outside cover, it is also contemplated that the holder may be attached at other locations upon the book, such as the inside cover. Furthermore, the holder disclosed herein is suitable for use with other articles having audio recordings associated therewith. Therefore, the present invention may be utilized in other articles besides books such as photo albums, folders, slide projectors and the like.

In one embodiment of the present invention, the cassette holder includes a body for holding a cassette tape and a coupling mechanism for securing the cassette holder to a book.

In another embodiment, the body further includes a pocket for holding the cassette tape and a flap coupled to the pocket for closing the pocket.

In one specific embodiment, the body is constructed from a pliable material, such as fabric. A hem is created at the periphery of the body to prevent fraying of the fabric.

While in still another embodiment, the body has a first section, a second section, a third section and a periphery. The pocket is formed by folding the third section onto the second section and sewing a portion of the periphery to form the pocket.

Another feature is a releasable closing mechanism wherein at least a portion of the closing mechanism is coupled to the flap for closing the pocket with the flap. The closing mechanism is a hook and loop connector. Alternatively, the releasable closing mechanism has an elongated tape member with first and second sides, each side having adhesive thereon for releasably engaging the flap with an exterior of the pocket.

In one embodiment, the coupling mechanism includes a pair of elongated tape members. Alternatively, the coupling mechanism is a hook and loop connector having two components, wherein a first component is coupled to the book and a second component is coupled to the cassette holder.

A further embodiment of the present invention is a method for providing a cassette holder for a book. The cassette holder has a body suitable for containing a cassette tape. The body also has a coupling mechanism suitable for coupling the holder to book. The cassette holder is attached to the book via the coupling mechanism.

Still yet another embodiment is a holder for attachment to an article to be viewed in conjunction with listening to an audio recording. The audio recording is carriable in the holder for preventing the recording from becoming disassociated from the article so that the audio recording can be readily played while viewing the article. The holder includes a body having a first section, a second section and a third section. The third section is folded onto the second section. At least a portion of a periphery of the body is sewn so that the second section and the third section form a pocket for holding the recording. A releasable closing mechanism has first and second components where the first component is coupled to the first section and the second component is coupled to the third section. The first section releasably couples with the third section to form a flap to close the pocket. A coupling mechanism is itself coupled to the holder for coupling attachment to an article.

In summary, the present invention's purpose is to provide an audio recording that is easily attachable to an article such as a book.

BRIEF DESCRIPTION OF THE DRAWINGS

FIG. 5 is a back view of another embodiment of the attachable cassette member with the first component of a hook and loop connector affixed thereto.

FIG. 7 is another embodiment of the releasable closing mechanism.

FIG. 8 is a first side of the elongated tape member of the releasable closing mechanism.

FIG. 9 is a second side of the elongated tape member of the releasable closing mechanism.

FIG. 10 is a first side of the elongated tape member of the coupling mechanism.

FIG. 11 is a second side of the elongated tape member of the coupling mechanism.

DETAILED DESCRIPTION OF THE PREFERRED EMBODIMENTS

Figure 3:
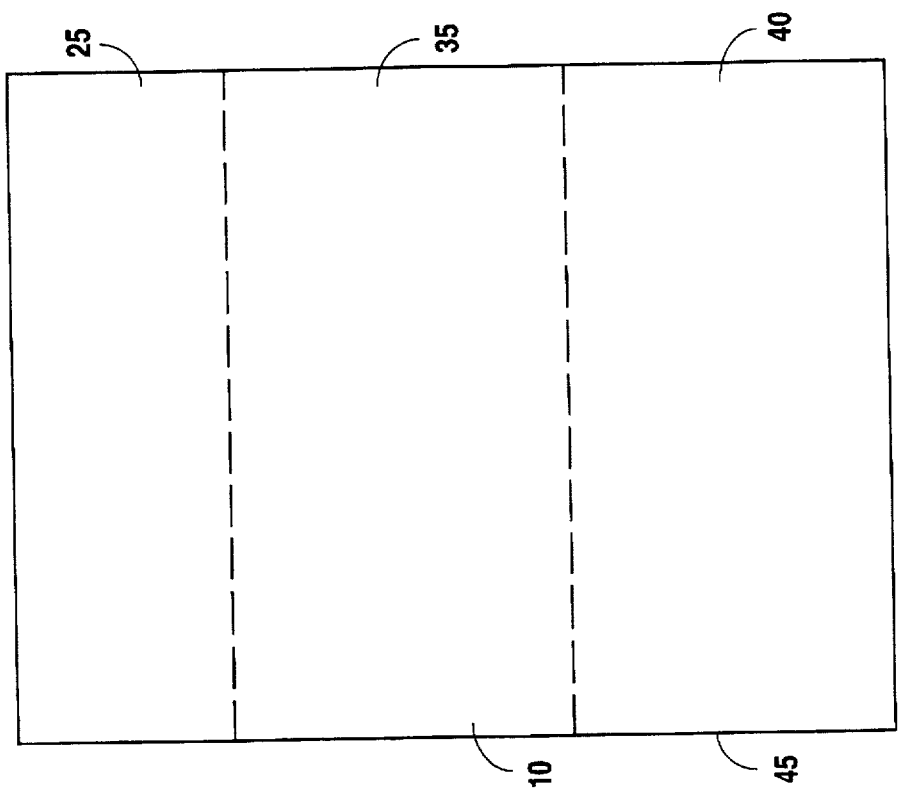
FIG. 3 is the body prior to being sewn into a cassette holder. The body has a first section, a second section, and a third section.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology wile be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. This terminology will include these words, specifically mentioned derivatives thereof, and words of similar import.

Furthermore, in the claims the elements have been recited as being "coupled"; the reason for such terminology being that it is anticipated that elements may be connected together in such a way that there are other components interstitially located between the connected elements or that the elements may be connected in fixed or movable relation one to the other.

Figure 1:
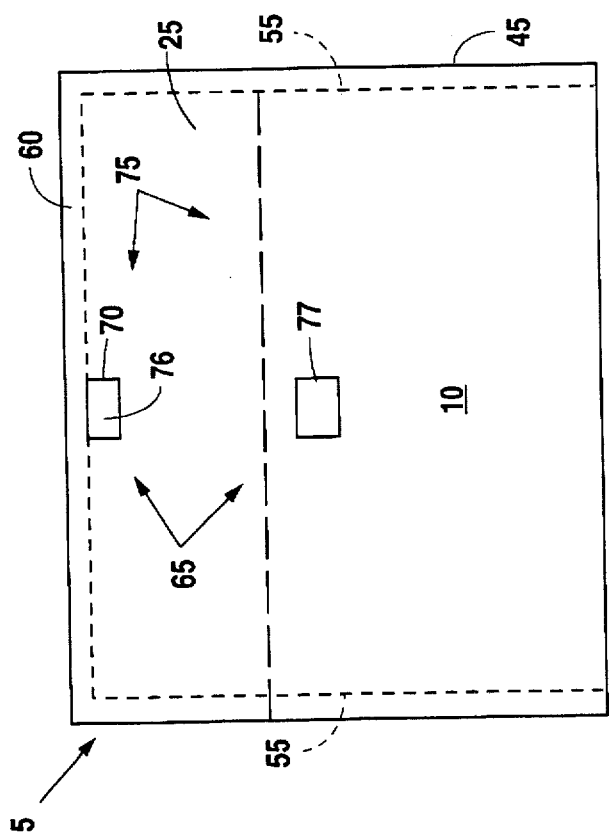
FIG. 1 is a front view of the attachable cassette holder with the flap in an open position.
Figure 2:
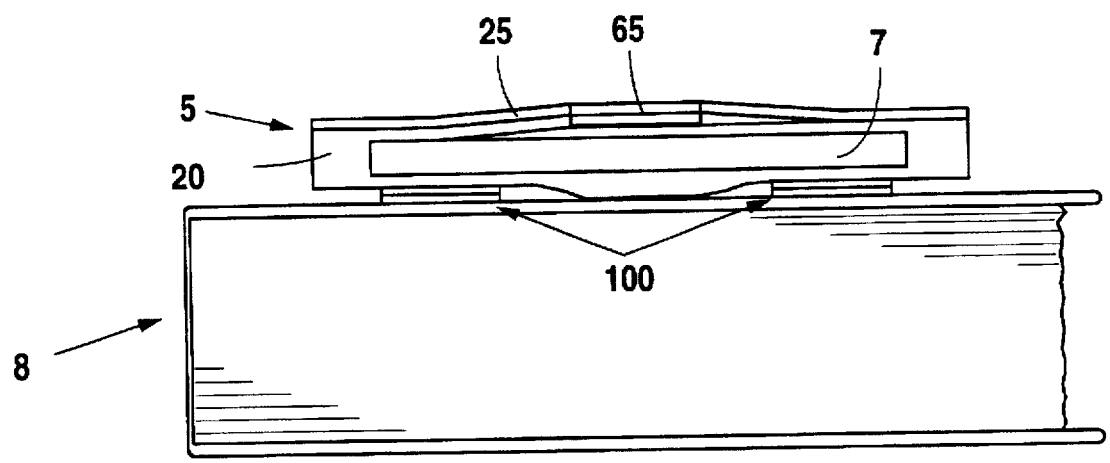
FIG. 2 is a partial cut-away view of the attachable cassette holder connected to a book and with a cassette located within the pocket of the holder.

Referring to the Figures, an attachable cassette holder 5 is illustrated. As shown in FIG. 3, the cassette holder or holder 5 is preferably made from a single unified rectangularly shaped, pliable material such as fabric. The body 10 has three sections. These sections are a first section or flap 25, a second section 35 and a third section 40. The first step in manufacturing the cassette holder 5 is folding the third section 40 onto the second section 35. As shown in FIGS. 1, 2 and 3, a portion 55 of a periphery 45 is sewn to create a pocket 20 for holding an audio recording or cassette tape 7. In the preferred embodiment, the entire periphery 45 of the body 10 is sewn to create a hem 60. The first section 25 becomes the flap 25 for the holder 5 as shown in FIG. 1.

A releasable closing mechanism 65 is attached to the flap 25 and the third section 40. In the preferred embodiment, the releasable closing mechanism 65 is a hook 76 and loop 77 connector sold under the trademark (VELCRO). In the embodiment of FIG. 7, an elongated tape member 80 is attached to the flap 25. FIGS. 10 and 11 illustrate that the tape member 80 has a first side 85 and a second side 90. An adhesive, such as glue, is applied to each side of 85 and 90. The glue allows the flap 25 to detachably connect with an exterior 95 of the pocket 20 for closing the pocket 20.

Figure 4:
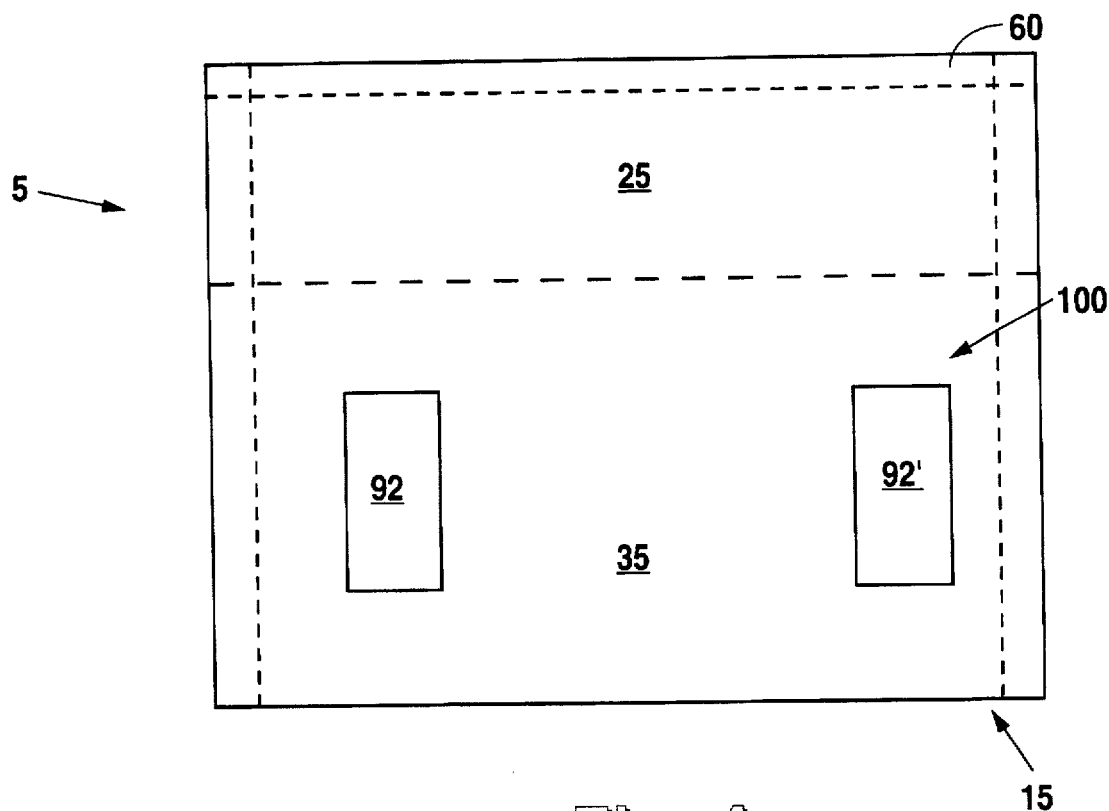
FIG. 4 is a back view of one embodiment of the attachable cassette holder with a pair of elongated tape members.

In the preferred embodiment of a coupling mechanism 15 as illustrated in FIG. 4, a pair 100 of elongated tape members 92 and 92' is attached to the back side of the holder 5. One elongated tape member 92 can be used, however two are preferred. Furthermore the tape members 92 and 92' are substantially identical, so only one tape member 92 will be hereinafter described.

As illustrated in FIGS. 8 and 9, the tape member 92 has a first side 93 and second side 94. An adhesive, such as glue, is applied to the first side 93 and second side 94 so that the first side 93 of the member 92 can be secured to the holder 35 while the second side 94 can be secured to a book 8 as illustrated in FIG. 6.

In an alternative embodiment, a hook and loop connector 104 is used for the coupling mechanism 15. The hook and loop connector has two components. A first component 105 is shown in FIG. 5 and a second component 110 is shown in FIG. 6. The first component 105 is connected to the back side of the holder 5 while the second component 110 is connected to a book 8. Components 105 and 110 can be connected to the holder 5 or book 8 by any adhesive means such as glue. The holder 5 is connected to the book 8 by placing the second component 110 onto the first component 105. In one embodiment, the first component 105 is comprised of hooks while the second component 110 is comprised of loops. In an alternative embodiment, the first component 105 is comprised of loops while the second component 110 is comprised of hooks. Though the Figures illustrate the holder 5 being coupled to the outer surface of the book 8, it should be understood that holder 5 can be coupled to any surface on or within the book 8.

Figure 6:
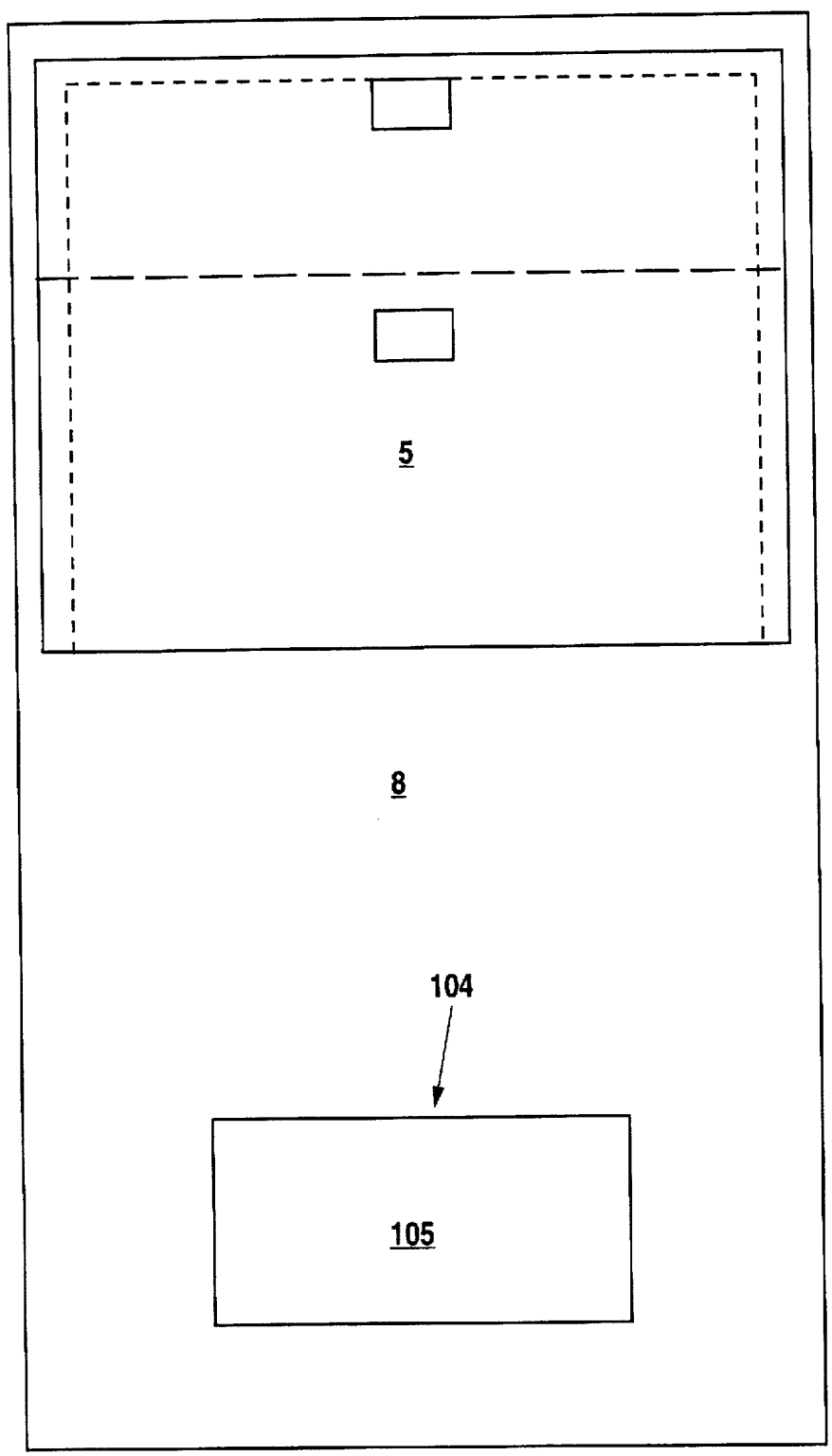
FIG. 6 is a front view of a book with the second component of a hook and loop connector affixed thereto with the holder affixed to the top portion of the book.

The preferred method of attaching the holder 5 to the book 8 is attaching the elongated members 92 and 92' as shown in FIG. 4 onto the book 8 as shown in FIG. 6.

It is to be understood that while certain forms of the present invention have been illustrated and described herein, it is not to be limited to the specific forms or arrangement of parts described and shown.

What is claimed and desired to be secured by Letters Patent is as follows:

1. A cassette containing holder attached to a book comprising:
   a holder (5) forming an enclosing pocket (20) from flexible fabric for receiving and restraining therein a cassette tape (7);
   a cassette tape (7) contained within said pocket (20) and restrained therein by a flap (25), said flap (25) being connected to said pocket (20) by a releasable closing mechanism (65);
   said holder (5) being releasably connected to an exterior of a book (8) by a coupling mechanism (15); and
   said coupling mechanism (15) between said holder (5) and said book (8) being a hook and loop connector (104).

2. A cassette containing holder attached to a book comprising:
   a holder (5) forming an enclosing pocket (20) from flexible fabric for receiving and restraining therein a cassette tape (7);
   a cassette tape (7) contained within said pocket (20) and restrained therein by a flap (25), said flap (25) being connected to said pocket (20) by a releasable closing mechanism (65);
   said holder (5) being releasably connected to an exterior of a book (8) by a coupling mechanism (15); and
   said coupling mechanism (15) between said holder (5) and said book (8) being a pair (100) of elongated tape members (92) and (92').

* * * * *